United States Patent [19]

Ohmura

[11] Patent Number: 4,771,566

[45] Date of Patent: Sep. 20, 1988

[54] TRIGGER STRUCTURE

[75] Inventor: Ryuichi Ohmura, Shizuoka, Japan

[73] Assignee: Fuji Kogyo Co., Ltd., Shizuoka, Japan

[21] Appl. No.: 9,022

[22] Filed: Jan. 28, 1987

Related U.S. Application Data

[63] Continuation of Ser. No. 792,602, Oct. 29, 1985, abandoned.

[30] Foreign Application Priority Data

May 13, 1985 [JP] Japan .................. 60-99635

[51] Int. Cl.4 ............................. A01K 87/00
[52] U.S. Cl. ........................................ 43/23
[58] Field of Search ................ 43/23, 21.2, 22

[56] References Cited

U.S. PATENT DOCUMENTS

| | | | |
|---|---|---|---|
| 950,656 | 3/1910 | Bush | 43/22 |
| 1,075,054 | 10/1913 | Morley | 43/23 |
| 1,965,857 | 7/1934 | Petry | 43/23 |
| 2,667,713 | 2/1954 | Stephens | 43/23 |
| 2,756,531 | 7/1956 | Hollenshead | 43/22 |
| 3,418,742 | 12/1968 | Yaklyvich | 43/23 |
| 3,466,783 | 9/1967 | Priebe | 43/23 |
| 3,653,141 | 4/1972 | Rumbaugh | 43/22 |
| 3,827,173 | 8/1974 | Barnes | 43/23 |
| 4,077,150 | 3/1978 | Barnes | 43/22 |
| 4,355,480 | 10/1982 | Morishita | 43/22 |
| 4,398,369 | 8/1983 | Weibe | 43/23 |
| 4,646,462 | 3/1987 | Ohmura | 43/18.1 |

FOREIGN PATENT DOCUMENTS 2337995 9/1977 France .
9764/1981 12/1954 Japan .

Primary Examiner—Nicholas P. Godici
Assistant Examiner—Karen Skillman
Attorney, Agent, or Firm—Holman & Stern

[57] ABSTRACT

A trigger structure for use in a fishing rod comprises: a mounting portion mounted on a grip portion of the fishing rod; and a trigger portion which perpendicularly projects from the above mounting portion so as to be bendable when such trigger portion is subjected to an outer forcible force. The trigger portion of the trigger structure is an injection molding product made of plastic so as to give an excellent touch feeling, whereby there is no fear that such trigger portion does some damages to the user's finger and hand even when such trigger portion hits the user in his finger and hand strongly at time when he performs his rapid hand changing operation in the fishing rod.

5 Claims, 2 Drawing Sheets

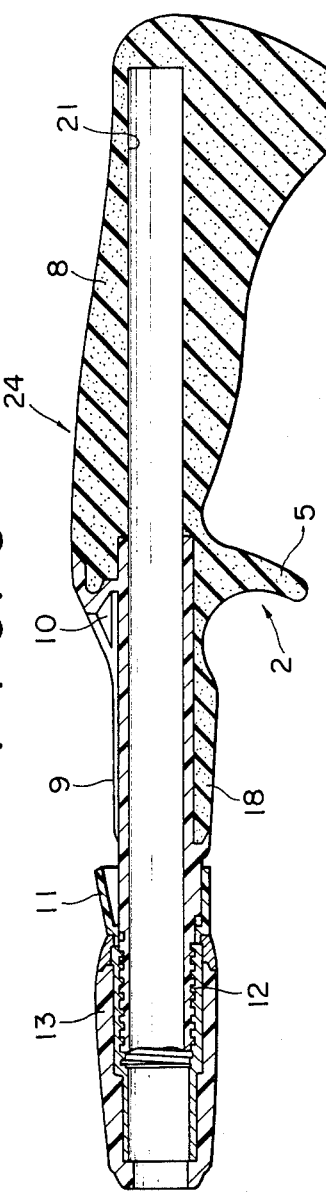
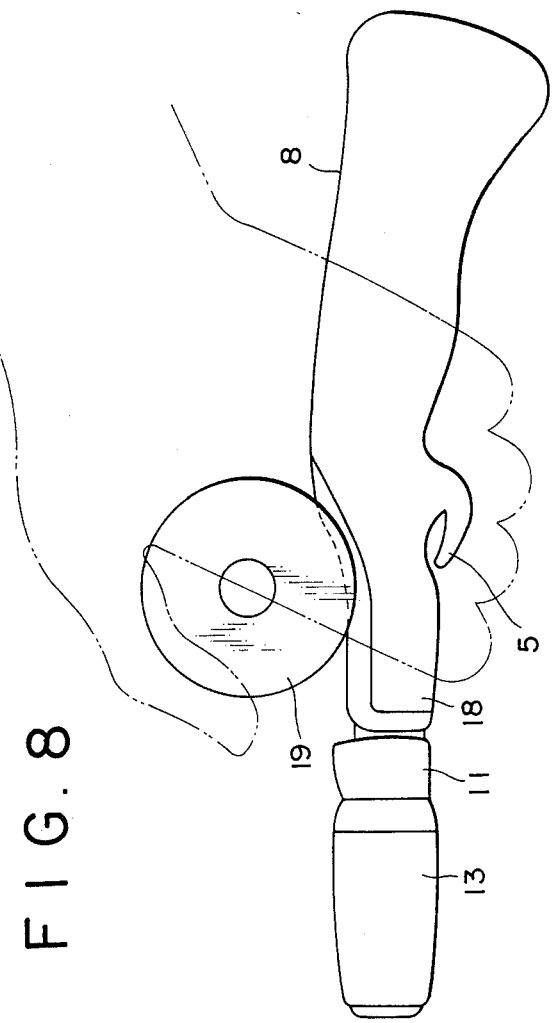
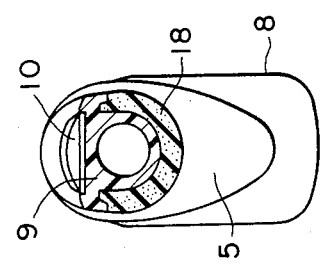

TRIGGER STRUCTURE

This is a continuation of application Ser. No. 06/792,602, filed Oct. 29, 1985 now abandoned.

BACKGROUND OF THE INVENTION

1. Field of the Invention

The present invention relates to a handle provided in a casting type of a fishing rod, particularly to a flexible trigger structure for use in the fishing rod.

2. Description of the Prior Art

In a casting rod handle provided with a conventional trigger structure, a grip portion and a trigger portion thereof are formed in an integral manner or in a separate manner, so that a casting-out operation of the fishing rod is facilitated, in which casting-out operation a user's finger rests on the trigger portion of the conventional trigger structure. In general, the trigger portion is made of a hard material such as glass fibers, graphite fibers or reinforced plastic or a metal material. Consequently in order to provide the trigger portion with sweat absorbing ability and a soft touch feeling, for example, the grip portion of the conventional trigger structure, which grip portion includes the trigger portion and is covered with a cloth or a leather as a whole, is disclosed in the Japanese Utility Model Laid-Open No. 97964/1981.

However, in the conventional trigger structure, since the trigger portion itself is made of a hard material such as a metal or hard plastic material, there are some disadvantages and a fear for the user's finger injured even if such trigger portion is covered with the cloth or the leather, as follows: for example, there is a disadvantage that the trigger portion hits other fishing gears with its tip when the user takes out or in the fishing rod from or into a fishing gear bag so that the trigger portion does often some damages to the other fishing gears. Further, it is necessary to perform a changing operation of the user's hand gripping position of the fishing rod from his right hand to his left hand or vice versa in order to perform a reeling operation right after a casting-out operation of the fishing rod. In case that such hand changing operation is rapidly performed, the user's finger and hand is often strongly hit by a tip of the trigger portion by mistake to cause the user's injures. Further, when the user performs a casting-out operation several hundreds times, a soft portion of the user's finger is strongly pressed by the trigger portion to give the user a considerable pain with a blister. Further, the conventional trigger structure has another disadvantage that it is hard to accomodate to the user's finger of all sizes. These disadvantages are inherent in the conventional trigger structure. Nevertheless, the conventional trigger structure has another disadvantage that it has been believed that a trigger portion must be rigidly formed in hard materials.

SUMMARY OF THE INVENTION

In the present invention, the above-mentioned disadvantages are resolved by intensively improving to provide a trigger structure in which a trigger member is not made of any hard materials so that a flexibility of the trigger member increases in a direction toward its tip so as to be excellent in its engagement with the user's finger. In other words, the trigger structure of the present invention is characterized in that it comprises: a rod mounting portion and a trigger portion which is made of a resilient plastic or a foamed plastic, perpendicularly projected from the mounting portion and gradually decreases in its thickness and rapidly decreases in its width in a direction toward its tip so that the tip of the trigger portion can be flexibly or resiliently bendable in a longitudinal direction of the fishing rod when subjected to an outer forcible force.

The mounting portion of the trigger structure of the present invention is not limited to only one integrally formed with a grip portion of the fishing rod, for example, it is possible to take a sleeve like shape into which the fishing rod is inserted between a reel seat and a rear grip, or to take a trough like shape to be tied to the fishing rod by means of thread or strings. Incidentally, the trigger portion is formed from a multilayer material in which a skin layer having an excellent touch feeling is formed on an outer surface of an elastic foamed body layer. As a result, such trigger portion is excellent in its engagement with the user's finger so that it enables the user to hold the fishing rod neatly when the fish is taken in, whereby the user may smoothly perform the casting-out operation of the fishing rod.

As described above, according to the present invention, since the trigger portion of the trigger member of the fishing rod is not made of any hard materials so that the flexibility of the trigger member increases in a direction toward its tip, such trigger portion can be easily bent when subjected to the outer forcible force so that there is no fear that such trigger portion does some damages to the other fishing gears and the user's finger and hand. Further, such trigger structure of the present invention has another advantage in that it may accomodate to the user's finger of all sizes. Further, although it is necessary to perform the changing operation of the user's hand position in the fishing rod from his right hand to his left hand or vice verse in order to perform the reeling operation after the casting-out operation, there is no fear that such trigger portion does some damages to the user's finger and hand even if the user grasps a handle of the fishing rod in its trigger portion strongly by mistake when he performs rapidly such hand changing operation, because he may grasp the handle of the fishing rod in a condition in which its trigger portion has been bent, whereby he may smoothly perform a handling operation of the fishing rod. Further, although the tip of the trigger portion is flexible, the butt portion of the trigger portion is stable enough to perform the casting-out operation of the fishing rod.

It is an object of the present invention to provide a trigger type handle for use in the fishing rod, which handle is provided with a tip of a trigger portion which has no fear that it does some damages to other fishing gears and the user's finger and hand.

It is another object of the present invention to provide a trigger type handle for use in the fishing rod, which handle is provided with a trigger portion which excellently accomodates to the user's finger of all sizes to perform a gripping operation of the fishing rod.

BRIEF DESCRIPTION OF THE DRAWINGS

The foregoing objects and advantages of the present invention will be apparent from the following description and accompanying drawings, wherein:

FIG. 6 is a fourth embodiment of the trigger structure of the present invention;

FIG. 7 is a longitudinal sectional view of the fourth embodiment of the trigger structure of the present invention shown in FIG. 6; and FIG. 8 is a side view of the fourth embodiment of the trigger structure of the present invention shown in FIG. 6, in use.

DESCRIPTION OF THE PREFERRED EMBODIMENTS

At first, a first embodiment of the trigger structure of the present invention will be hereinbelow described with reference to FIGS. 1 to 3.

Figure 1:
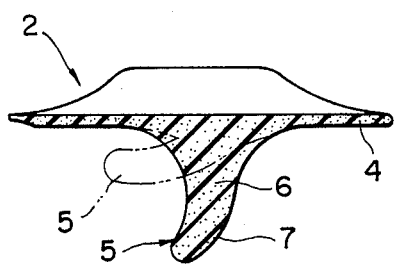
FIG. 1 is an enlarged longitudinal sectional view of a first embodiment of a trigger structure of the present invention for use in the fishing rod.
Figure 2:
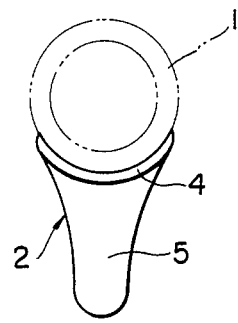
FIG. 2 is an enlarged front view of the first embodiment of the trigger structure of the present invention.
Figure 3:
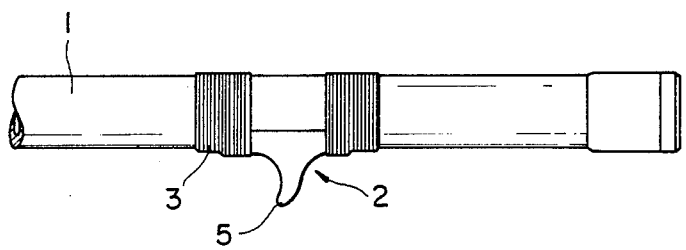
FIG. 3 is a side view of the first embodiment of the trigger structure of the present invention, which first embodiment is mounted on the fishing rod.

In FIG. 1, an enlarged sectional view of a trigger member 2 for use in the fishing rod is shown, and in FIG. 2, an enlarged front view of the same is shown. In FIG. 3, the trigger member 2 is shown in a condition in which it is tied to a fishing rod 1 to be fixed thereto by means of thread 3. In other words, in this trigger member 2, its mounting portion 4, which has a predetermined length and a trough like shape, and its flexible trigger portion 5 are integrally formed so that the trigger portion 5 is perpendicularly projected from the mounting portion 4. In assembling thereof in the fishing rod 1, an inner surface of the mounting portion 4 is abutted against the fishing rod 1, and then both ends of the mounting portion 4 of the trigger member 2 are tied to the fishing rod 1 by means of the thread 3, if necessary, with the use of a resinous paint which is applied to the thus tied thread 3 and cured later. Both of the mounting portion 4 and the trigger portion 5 of the trigger member 2 are formed of resilient plastic or foamed plastic, for example, polyurethane foam which is produced through an injection molding process, in which trigger member 2 an outer surface of an inner elastic body layer 6 is covered with a skin layer 7 which is excellent in its touch feeling, as shown in the enlarged sectional view thereof in FIG. 1. The trigger portion 5 of the trigger member 2 rapidly decreases in its width and gradually decreases in its thickness in a direction toward its tip projecting from its base part which is integrally connected with the mounting portion 4 of the trigger member 2. Namely, as shown in the side view of the trigger member 2 in FIG. 1, the trigger portion 5 of the trigger member 2 is curved forward to be oblique forward while it decreases in its thickness in a direction toward its tip so as to adequately act as a finger rest of the user. Further, as shown in FIG. 2, when viewing the trigger member 2 in front of the same, both side edges of the trigger portion 5 are shaped into hyperbolas directed downward between the base part of the trigger portion 5 and its tip, so that the width of the trigger portion 5 decreases in a direction toward its tip. In cross-section of the trigger portion 5 of the trigger member 2, since the width of the trigger portion 5 is larger than the thickness of the same in dimension, a structure of the trigger portion 5 has a tendency to bend fore and aft, particularly in a forward direction as shown with a chain line in FIG. 1 under the influence of the outer forcible force. Consequently, there is no fear that the trigger portion 5 of the trigger member 2 does some damages to the user's finger and hand even if the user strongly grasps the handle of the fishing rod in its tip of trigger portion 5 by mistake in his rapid hand changing operation after he performed the casting-out operation of the fishing rod, because at this time the trigger portion 5 is placed in its bent condition under the same effect as that described later with reference to FIG. 8. Further, there is also no fear that the trigger portion 5 of the trigger member 2 does some damages to other fishing gears when the fishing rod is taken out from the fishing gear bag. Further, the trigger portion 5 of the trigger member 2 has an effect that it enables its flexible projecting end part to accomodate to the user's finger of all sizes. Incidentally, since the outer surface of the trigger portion 5 of the trigger member 2 is covered with the skin layer 7 so that the trigger portion 5 gives an excellent touch feeling to make it possible that the user's finger is brought into a soft contact with the trigger portion 5 under the resilient effect of the rounded foamed layer 6 of the trigger portion 5 even when the user's finger is pressed against the trigger portion 5 strongly, the user's finger and wrist are prevented from being fatigued when the user performs the casting-out operation of the fishing rod.

Figure 4:
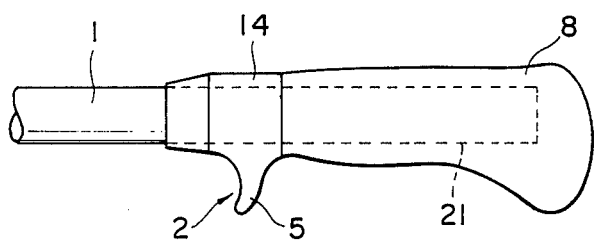
FIG. 4 is a side view of a second embodiment of the trigger structure of the present invention.

In the second embodiment of the trigger structure of the present invention shown in FIG. 4, a grip 8 is mounted on an end of the fishing rod 1, in a front portion of which grip 8 the trigger member 2 is disposed. The trigger portion 5 of the trigger member 2 is integrally formed with a sleeve like mounting portion 14 of the trigger member 2, which mounting portion is mounted on the front portion of the grip 8. In the second embodiment of the trigger structure of the present invention, an outer surface of an inner foamed layer of the trigger portion 5 of the trigger member 2 is covered with a skin layer as is in the case of the first embodiment of the trigger structure of the present invention, so that the trigger portion 5 of the trigger member 2 may bend fore and aft under the effect of an outer forcible force, whereby the second embodiment of the trigger structure of the present invention provides the same effect as that provided in the first embodiment thereof before and after the casting-out operation of the fishing rod. Further, a bore 21 is provided in the grip portion so that the grip portion is inserted into the fishing rod.

Figure 5:
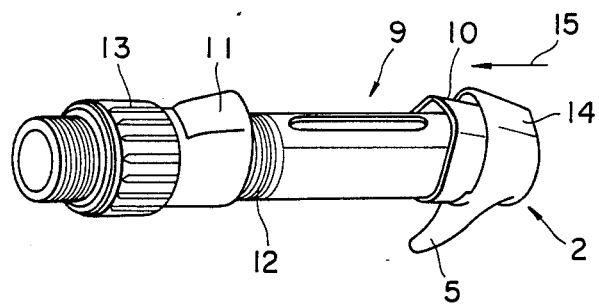
FIG. 5 is a side view of a third embodiment of the trigger structure of the present invention.

FIG. 5 shows a third embodiment of the trigger structure of the present invention, in which the third embodiment, a trigger member 2 is pushed in a direction designated by the reference numeral 15 to be mounted on a mounting sleeve 10 of a reel seat 9. In FIG. 5: the reference numeral 11 designates a movable sleeve of the reel seat 9; the numeral 12 designates a threaded portion; and the numeral 13 designates a female screw sleeve of the reel seat 9. A trigger portion 5 of the trigger member 2 is integrally formed with the sleeve like mounting portion 14 of the trigger member 2 in a manner that the trigger portion 5 perpendicularly projects outward from the mounting portion 14. Since the trigger portion 5 of the trigger member 2 is flexible, it has the same effect as that obtained in the foregoing embodiments of the present invention.

FIGS. 6 and 7 show a fourth embodiment of the trigger structure of the present invention, in which fourth embodiment a mounting portion 24 including a grip 8, a trigger portion 5, and an extension part 18 covering the fishing rod in its position opposite to a reel seat 9 are integrally formed with each other. The reel seat 9 is made of a hard plastic material and is inserted into a front end portion of the grip 8, a lower side portion of which reel seat 9 is abutted against the extension part 18 of the trigger portion 5, so that these portions are integrally bonded to each other. Incidentally, in FIGS. 6 and 7, each portion corresponding to that shown in FIGS. 4 and 5 is designated by the same reference numeral employed in FIGS. 4 and 5.

FIG. 8 shows a condition in which the user takes in a fish while he firmly hold the fishing rod around a base portion of its reel 19. If the trigger portion 5 of the trigger member 2 is made of a hard material and has a sharp tip as is in the case of the conventional trigger structure, such hard and sharp trigger portion provides a danger in performing a taking in/out operation of the fishing rod relative to the fishing gear bag, while there is a fear that such hard and sharp trigger portion does some damages to the user's finger and hand when the user rapidly grasps such trigger portion at a time when he performs his hand changing operation in his fish taking-in action. In contrast with this, as shown in FIG. 8, in the trigger structure of the present invention, there is no fear that the trigger portion 5 of the trigger member 2 does some damages to the user's finger and hand even if the user grasps the trigger portion 5 strongly in his rapid hand changing operation in the handle of the fishing rod, because at this time the trigger portion 5 of the trigger member 2 is bent forward and brought into a soft contact with the user's finger and hand. Incidentally, the configuration of the trigger portion of the trigger structure of the present invetion is not limited to those shown in the accompanying drawings.

While there has been shown and described the fundamental novel feature of the trigger structure of the present invention as applied to the preferred embodiments thereof, it will be understood that various omissions and substitutions and modifications in the form and details of the trigger structure illustrated may be made by those skilled in the art without departing from the spirit of the present invention. It is therefore to be limited only by the scope of the following claims and reasonable equivalents thereof.

What is claimed is:

1. In a casting handle for a fishing rod which includes a grip portion and a reel seat, a trigger structure comprising: a sleeve-like mounting portion mounted on the grip portion of the fishing rod; and a trigger portion made of a resilient plastic material integrally formed with the mounting portion which perpendicularly projects from said mounting portion and is bendable at least in a longitudinal direction of said fishing rod when grasped by a user in a hand-changing operation, the trigger portion being bendable to a position in which a tip end of the trigger portion is adjacent the mounting portion, the seal comprising a cylindrical tubular member disposed forwardly of the trigger structure, the tubular member having a threaded forward end, a movable sleeve on the reel seat, and a threaded collar on said treaded forward end engaging the movable sleeve.

2. The trigger structure as set forth in claim 1, wherein:
said mounting portion of said trigger structure is formed into a substantially sleeve like shape and mounted on a mounting sleeve of a reel seat of said fishing rod.

3. The trigger structure as set forth in claim 1 wherein:
each of said mounting portion, and said trigger portion of said trigger structure is an injection molding product made of resilient plastic foam.

4. The trigger structure as set forth in claim 1, wherein:
said trigger portion of said trigger structure rapidly decreases in its width and gradually decreases in its thickness in a direction toward its tip projecting from its base part, and is slightly tilted in its tip in a direction toward a front end of said fishing rod while curved in its inner surface.

5. In a casting handle for a fishing rod which includes a grip portion and a reel seat, a trigger structure comprising a sleeve-like mounting portion mounted on the grip portion of the fishing rod, and a trigger portion made of a resilient plastic material integrally formed with the mounting portion which trigger portion perpendicularly projects from said mounting portion and is bendable at least in a longitudinal direction of the fishing rod when grasped by a user in a hand-changing operation, the trigger portion being bandable to a position in which a tip end of the trigger portion is adjacent the mounting portion.

* * * * *